May 10, 1966  O. J. ADAMS  3,250,370
MOLD TRANSFER SYSTEM
Filed Nov. 26, 1963  3 Sheets-Sheet 1
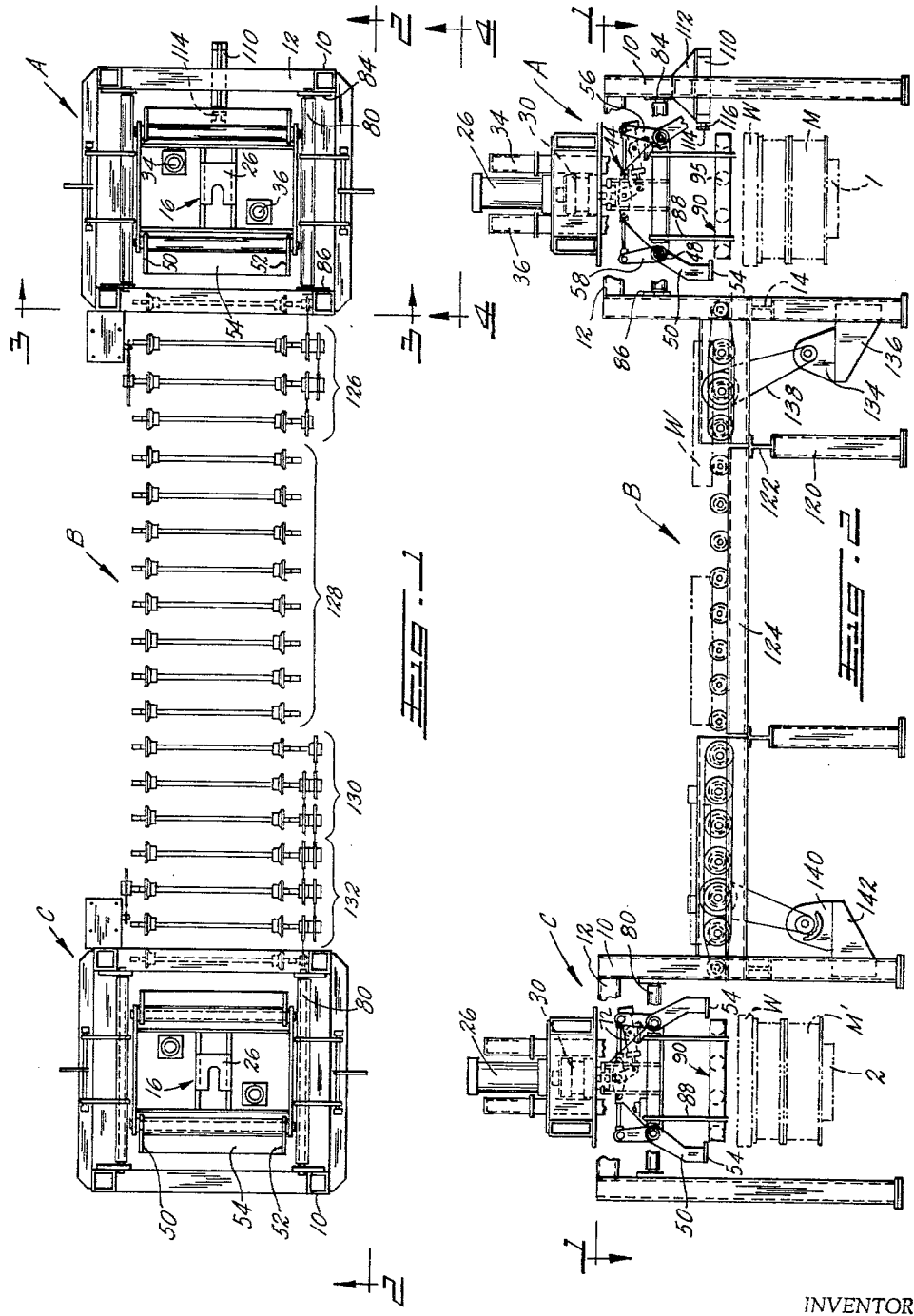
INVENTOR.
OTIS J. ADAMS
BY
Oberlin, Maky & Donnelly
Attorneys

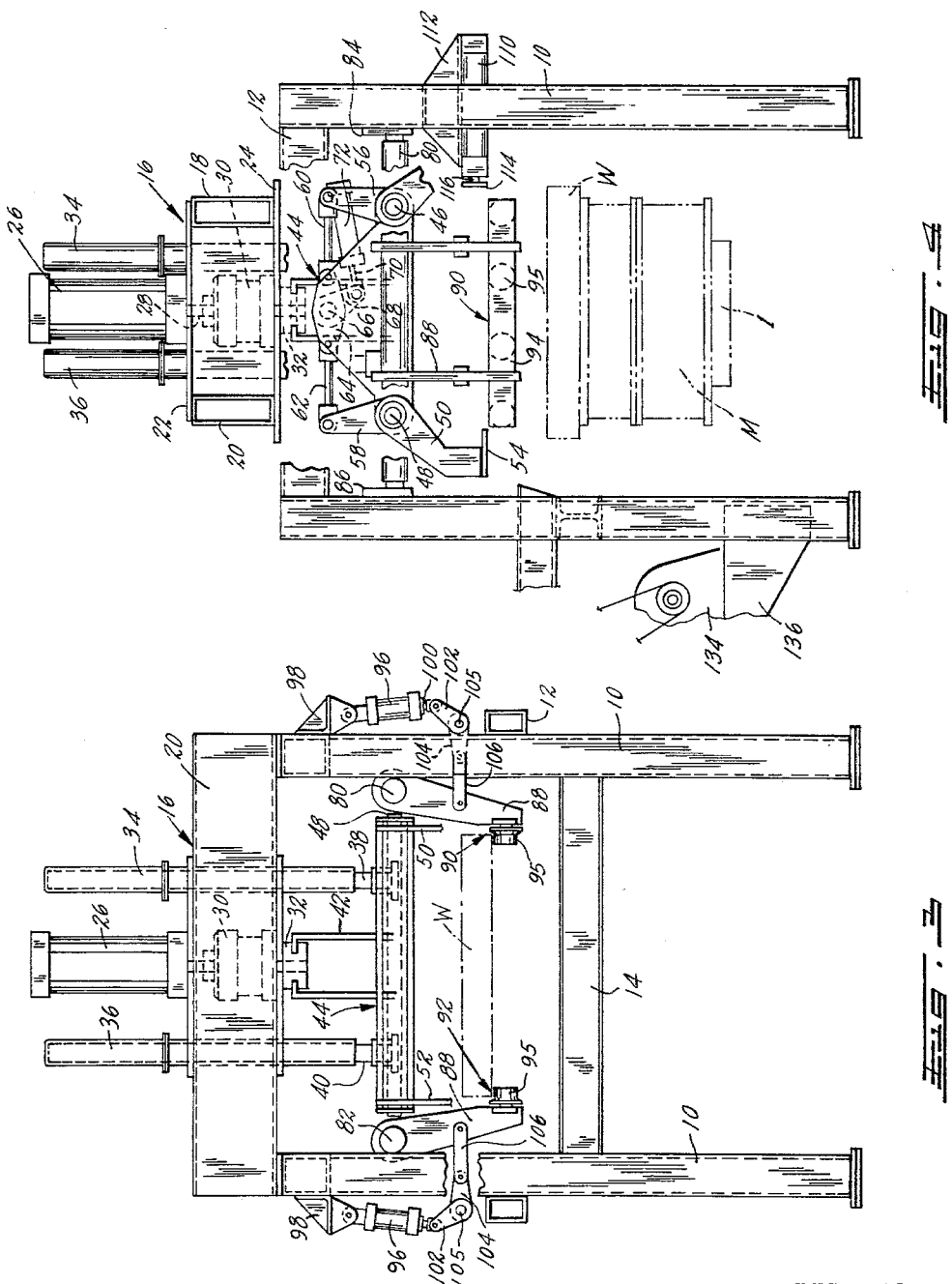

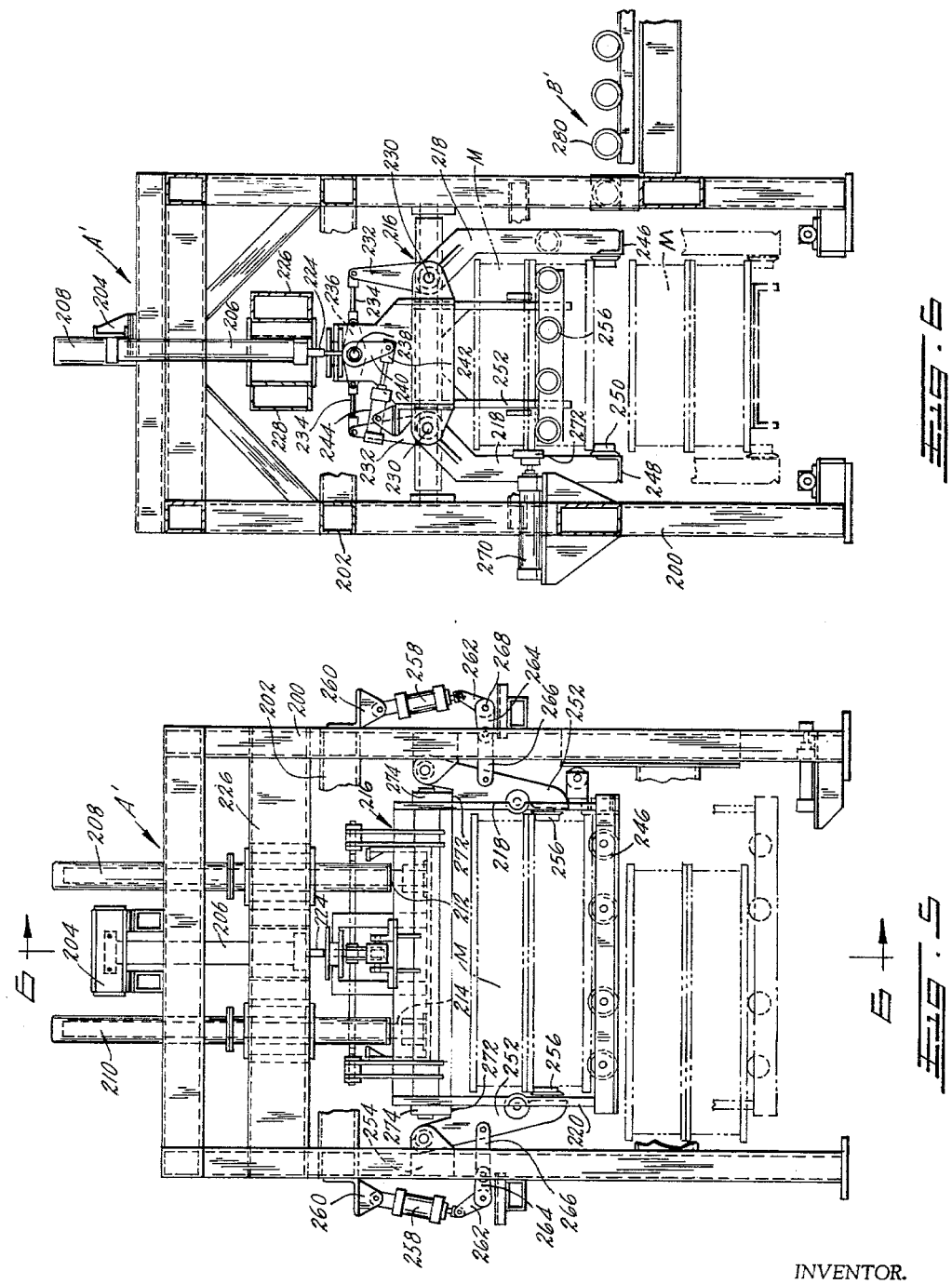

United States Patent Office 3,250,370
Patented May 10, 1966

3,250,370
MOLD TRANSFER SYSTEM
Otis J. Adams, Chagrin Falls, Ohio, assignor to Bartlett-Snow-Pacific, Inc., Cleveland, Ohio, a corporation of California
Filed Nov. 26, 1963, Ser. No. 325,902
11 Claims. (Cl. 198—20)

The present invention relates as indicated to a mold transfer system and relates more particularly to an improved conveyor and transfer system for lifting, transferring and setting various mold pieces or articles from one location in the system to another.

The employment of moving conveyor type mold handling systems has presented certain persistent problems. A primary example is how best to accommodate molds requiring different cooling times without sacrificing the rate of pouring or other operations common to a mold handling system. Heretofore, in the single loop, continuously moving mold conveyor systems, the pouring rate is controlled by the length of the conveyor and the time required for cooling of the poured molds.

It will thus be seen that a multiple moving conveyor system, wherein poured molds requiring a longer cooling time can be transferred to one or more continuous secondary or cooling conveyors and later transferred in a cooled condition back to the main or primary conveyor, will inherently overcome the primary problem noted above in present mold conveying systems. In such multiple moving conveyor systems it will be appreciated that the conveyors must often be properly synchronized for transferring the mold articles from one conveyor to another. Where the mold conveyors are constantly moving, such synchronization is not particularly difficult to achieve. However, where the system is non-continuous, the starting and stopping of the conveyors, with attendant changes in acceleration and deceleration, respectively, makes it very difficult to automate present mold handling equipment. It is particularly difficult with such present equipment to set the mold articles accurately on the conveyors.

It is a primary object of the present invention to provide novel apparatus for transferring mold articles comprising molds and mold weights from one conveyor to another conveyor.

A more specific object of the present invention is to provide a handling apparatus for lifting mold articles at a first station from a first conveyor, transferring the articles to a second station, and setting the mold articles at the proper position on a second conveyor.

A further object is to provide such a mold article handling apparatus the employment of which permits a faster pouring cycle.

A further object is to provide a mold transfer system capable of providing accurate setting of the mold articles regardless of conveyor speed.

A further object of the invention is to provide a mold transfer system enabling floor space requirements to be substantially reduced.

These and other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

In said annexed drawings:

FIG. 1 is a top plan view of the transfer system of the present invention, illustrating the mold weight transfer mechanism for transferring mold weights from one conveyor to another;

FIG. 2 is a side elevational view of the mold weight transfer mechanism;

FIG. 3 is an enlarged vertical sectional view taken on line 3—3 of FIG. 1;

FIG. 4 is an enlarged end elevational view taken on lines 4—4 of FIG. 2;

FIG. 5 is a side elevational view of a modified transfer mechanism for transferring molds from one conveyor to another; and FIG. 6 is a vertical sectional view taken on lines 6—6 of FIG. 5.

Referring now to the drawings, wherein like parts are indicated by like reference characters, and initially FIGS. 1 and 2, there is illustrated therein the system for handling mold articles which comprises a pickoff station A, a transfer station B, and a setting station C. Although the following described handling system relates to mold weights, it should be understood that the system is in addition capable of handling other mold articles such as the molds themselves, and the term "mold articles" as used hereinafter is meant to include such broader use of the handling system of the present invention. In fact, the handling system of the present invention could be satisfactorily employed in other fields of material handling not related to foundry molding systems.

In the form shown in FIGS. 1–4, mold weights W are adapted to be transferred from a conveyor associated with the pickoff station A to the setting or placement station C over the transfer station B for setting the weight W on a moving mold M moving along the second conveyor associated with the setting station C.

The mold weight handling system illustrated in FIGS. 1–4 generally described comprises means for engaging and lifting the weights W from the mold M traveling on the conveyor 1 extending through the pickoff station A, raising the weight W to a predetermined height, shifting the mold weights to a transfer station B, transferring the weights W by both power rolls and idler rolls to the setting station C, and accurately setting the weights W on the mold M' moving on the conveyor 2 which extends through the setting station C.

The pickoff station A and the setting station C are identical in structural detail and therefore only one need be described in detail. Referring to FIGS. 3 and 4, the pickoff station A comprises vertically extending corner posts collectively designated at 10 and horizontally extending frame members collectively referenced at 12 which interconnect the top and intermediate portions of the corner posts 10 and are secured thereto thereby to provide a rigid main frame structure. A support beam 14 extends between the posts 10 adjacently disposed to the transfer system B and serves to support the adjacent end of the transfer station, as will be hereinafter described. Rigidly secured to the top of such main frame and extending between the posts 10 in one direction is a top supporting frame generally indicated at 16 which comprises elongated hollow supporting beams 18 and 20 secured to the frame members 12, and top and bottom plates 22 and 24 secured to the beams 18 and 20 and extending therebetween.

A relatively long stroke cylinder 26 is mounted on the top supporting frame 16, the cylinder having a piston (not shown) reciprocably mounted therein with a piston rod 28 connected thereto and extending through an opening in the top plate 22 of the top frame. A relatively short-stroke cylinder 30 is rigidly secured to the rod 28 and in turn is provided with an internally reciprocable piston (not shown) having a piston rod 32 extending therefrom, plate 24 being provided with an opening for accommodating vertical movement of the cylinder 30 therethrough.

A pair of guide cylinders 34 and 36 are rigidly mounted on the top frame 16 and extend downwardly through openings therein. A pair of guide rods 38 and 40 are telescoped within the guide cylinders 34 and 36, respectively, for relative movement thereto. The piston rod 32 of the short cylinder 30 is operatively connected to the rods 38 and 40 through a series of spaced, vertically extending connecting arms 42 connected at their upper ends to the piston rod 32 and at their lower ends to a carrying arm support carriage generally indicated at 44, the latter being in turn rigidly connected to the guide rods 38 and 40. It will thus be seen that the vertical movement of the piston 32 and the carrying arm support carriage 44 is guided and vertically aligned by the guide rods 38 and 40.

Carrying arm support shafts 46 and 48 are mounted for rotation at opposite ends of the carriage 44. Each of the supporting shafts 46 and 48 has fixed thereto a pair of spaced supporting arms, the shaft 48, for example, rigidly supporting carrying arms 50 and 52. Mounted at the bottom of each arm 50 and 52 and extending therebetween is a flat carrying plate 54 which functions to support the weight W as will be hereinafter described. It will be understood that the shaft 46 rigidly mounts carrying arms identical to arms 50 and 52 and a supporting plate identical to plate 54, which have not been shown in order to expose structure to be hereinafter described. It will thus be apparent that rotation of support shafts 46 and 48 will effect inward or outward movement of the carrying arms and the supporting plates at the bottoms thereof whereby such plates can be rotated to a position underlying the weight W for lifting the same.

Referring now to the means for rotating the shafts 46 and 48, a pair of link arms 56 and 58 are fixed at their lower ends to the shafts 46 and 48, respectively, and are pivotally connected at their upper ends to actuating rods 60 and 62, respectively. Rods 60 and 62 are pivotally connected at the inner ends thereof to an oscillating link member 64 which is fixed to shaft 66. Shaft 66 in turn is rigidly secured to a crank member 68 the bottom end of which is pivotally connected to piston rod 70 of a piston-cylinder assembly 72. The piston-cylinder assembly 72 is mounted on the vertically movable support carriage 44 in any suitable manner. It will thus be seen that actuation of the piston-cylinder assembly 72 and piston rod 70 will rotate the crank 68 and the shaft 66 thereby rocking link 64 and moving the inner, pivotally connected ends of the rods 60 and 62 downwardly and upwardly, respectively. The upper ends of the link arms 56 and 58 will thereby be moved inwardly thereby producing an outward movement of the supporting plates 54 due to the rigid mounting of the carrying arms on the shafts 46 and 48. Similarly, actuation of the piston-cylinder assembly 72 so as to withdraw piston rod 70 will effect an inward movement of the carrying arms and the supporting plates attached thereto, such inner position being shown in FIG. 4.

It will thus be seen that the vertically movable carrying arm support carriage 44 can be lowered to a point where the supporting plates 54 are positioned below the bottom edge of the weight W as the same and the mold M are traveling along the conveyor 1. In this manner the weight W will merely ride onto the supporting plates 54 whereby subsequent lifting of the carriage 44 will effect a lifting of the weight W from the mold M.

A pair of tubular supporting shafts 80 and 82 extend between opposite sides of the main frame and are rigidly secured thereto by means of bracing plates 84 and 86 rigidly secured to the frame. Each of the supporting shafts 80 and 82 has pivotally mounted therearound a pair of supporting arms collectively designated at 88 which are axially spaced on the supporting shafts and to which are secured roller assemblies generally designated at 90 and 92, there being one such roller assembly disposed at each side of the frame. Each roller assembly 90 and 92 comprises a carrying bar 94 mounted on the associated supporting arms and a plurality of individual flanged rollers collectively designated at 95 which function to support the weight W during certain phases of the pickoff operation, as will be hereinafter described.

Operatively connected to each of the supporting arms 88 is a piston-cylinder 96, the upper end of which is secured to a cylinder support bracket 98 mounted on the main frame. Each piston-cylinder device is provided in the usual manner with a piston rod 100 having an outer end pivotally connected to a transfer link 102. The opposite end of the transfer link 102 and the adjacent end of link member 104 are fixed to shaft 105, the link member 104 being connected at its opposite end to a second link member 106 which is pivotally connected to the supporting arms 88. The described linkage is such that actuation of the piston-cylinder 96 will effect horizontal movement of the second link 106. For example, when the piston rod 100 is extended from the FIG. 3 position, the links 102 and 104, which in effect form a unitary assembly with shaft 105, will be rotated clockwise about the mounting for the shaft 105, such rotation resulting in movement outwardly of the second link 106 and arms 88. Similarly, subsequent retraction of the piston rod 100 to its FIG. 3, weight supporting position will effect inward movement of the associated supporting arms 88. The means for actuating the oppositely disposed supporting arms 88 is of course identical, as indicated by the same reference characters, whereby the arms 88 can be moved simultaneously toward or away from each other to support or release the mold weight.

A discharge ram 110 for discharging the mold weights W from the pickoff station A to the transfer station B is rigidly mounted on the main frame by means of a support bracket 112. The discharge ram 110 is conventional and is provided with a front contact plate 114 rigidly attached to piston rod 116 and movable therewith. The discharge ram 110 shifts the weight W supported on the rollers 95 to the left, as viewed in FIG. 4, between the carrying arms 50 and 52 to the transfer station B.

The handling operation at the pickoff station A will now be described. At the beginning of the lifting operation, the carrying arm support carriage 44 is lowered by the long-stroke cylinder 26 and short-stroke cylinder 30 to a position whereat the flat supporting plates 54 are disposed vertically slightly below the level of the mold weight as the same is traveling on the mold M on the conveyor 1. The arms 50 and 52 at this time are retracted whereby the inner ends of the oppositely disposed plates 54 are outside the line of travel of the mold weight W. As the mold weight W on the mold M reaches the proper point at the pickoff station A, the piston-cylinder 72 is actuated whereby the plates 54 are moved into position under the weight W. When the weight W becomes centered in the pickoff station A, the cylinder 26 is actuated thereby retracting the piston rod 28 at the same time cylinder 30 is actuated retracting piston rod 32, and the carriage 44 movable therewith. The weight W is thus lifted by the plates 54 upwardly from the mold M.

When the mold weight W has been lifted to its uppermost position slightly above the rollers 95 and while the weight is still supported by the plates 54, the supporting arms 88 are moved inwardly by the piston-cylinders 96, the rollers 95 thus moving to a position beneath the mold weight W. The cylinder 30 is then actuated whereby the carriage 44 and the supporting plates 54 carried thereby are lowered whereby the weight W is lowered onto the rollers 95 for support thereby.

The discharge ram 110 is then actuated whereby the contact plate 114 physically engages and shifts the weight W to the left as viewed in FIG. 4. The spacing of the carrying arms 50 and 52 is such as to define an opening of sufficient dimension to accommodate the passage of the mold weight therethrough responsive to actuation of discharge ram 110. The weight W after passing the opening or window defined by the carrying arms 50 and 52 moves onto the power rolls forming part of the transfer station B, as will be hereinafter described. It should be noted that by accommodating movement of the weight W through the opening defined by the carrying arms 50 and 52, no further movement of such arms is required. Through this structural arrangement, a much shorter cycle time is realized.

After the weight W has cleared the pickoff station A, the piston-cylinders 96 are actuated to move the roller assemblies 90 and 92 to a retracted, open position. The cylinder 26 is then actuated to move the carriage 44 downwardly to its starting position wherein the supporting plates 54 are disposed slightly below the path of the succeeding weight W.

Referring again to FIGS. 1 and 2, the transfer station B comprises a series of power and idler rolls which are rotatably supported on a suitable frame structure comprising vertically extending posts 120, transversely extending support beams 122 and longitudinally extending frame members 124 between which are mounted the rolls.

The rolls comprise a first series of power rolls 126 adjacent the pickoff station A, a series of idler rolls 128, a series of relatively slow power rolls 130 and a final series of power rolls 132 adjacent the setting station C. The first series of power rolls 126 are driven by a motor 134 mounted on support 136 rigidly secured to the transfer station frame as illustrated. A conventional chain and sprocket drive indicated at 138 is employed for driving the roll 126.

A motor 140 mounted on support 142 is provided for driving the final series of power rolls 132 and the relatively slow power rolls 130, there being provided a conventional speed reducing device (not shown) to obtain such speed reduction. Although not intended to be a limitation as to roll speed, highly satisfactory results have been obtained where the power rolls 126 and 132 have been operated to transfer the weights W at a rate of 60 feet per minute, and the relatively slower power rolls 130 have been operated to transfer the weights W at a rate of 40 feet per minute. With these speeds, the discharge of the weights from the pickoff station A and the feeding of the weights to the setting station C can be properly synchronized.

The operation of the transfer station B is as follows. The weight W discharged from the pickoff station A as previously described is carried by the constantly running power rolls 126 to the idler rolls 128 which convey the weights to the relatively slow power rolls 130. The unit of idler rolls 128 is slightly downwardly inclined to facilitate the rolling of the weight W thereover. At the same time a weight W is discharged from the pickoff station A a preceding weight W resting on the power rolls 132 is carried thereby into the setting station C through the opening or window formed by the carrying arms 50 and 52. The next weight W is at this time transferred by the relatively slow power rolls 130 to the final power rolls 132. When the first weight W is in position in the setting station C, the power rolls 132 and 130 stop rotation. The differential in speed between the power rolls 132 and the relatively slow power rolls 130 provides a proper interval between the weights W entering the setting station C. As can be seen in FIG. 2, there are normally three such weights W on the transfer station B at all times.

As previously indicated, the setting station C is structurally identical to the pickoff station A and accordingly like reference characters have been employed. As will be understood, however, the setting station C functions to receive the weights from the transfer station B and to lower and set the same onto the mold M traveling on the movable conveyor 2 which extends through the setting station therebelow.

In the operation of the setting station C, the setting cycle starts when a previously set weight W is in proper position in the setting station. In such proper position, the weight W is supported by the rollers 95 of the roller assemblies 90 and 92. At this stage of the setting cycle, the flat supporting plates 54 are disposed slightly below the top surface of the rollers 95, with the plates 54 being disposed in a position to receive the weights when the carriage 44 is raised. When the weight W is in this position, the cylinder 30 retracts whereby the carrying arms and the plates 54 attached thereto lift the weight W off the rollers 95. The piston-cylinders 96 are then actuated to move the supporting arms 88 away from each other and out of the path of the weight W when subsequently lowered. The cylinder 26 is then actuated to lower the carriage 44 and the weight W carried thereby to a level within approximately 2 inches of the mold M. When the mold M which is traveling on the conveyor 2 is in proper position beneath the setting station C, the short cylinder 30 is actuated thereby lowering the weight W onto the mold M. The piston-cylinder 72 is then actuated to open the carrying arms 50 and 52 and the cylinder 26 actuated to retract the carriage 44 upwardly to a weight-receiving position, the cylinder 72 closing the carrying arms 50 and 52. The supporting arms 88 are then moved into position to receive the next weight.

It will be noted that by employing the short-stroke cylinder 30 in tandem with the long-stroke cylinder 26, a greatly simplified and more accurate operation is provided. The final short stroke of the cylinder 30 assures that the weight W is placed on the mold M within the working tolerance regardless of the speed of the conveyor 2 or whether it is starting or stopping.

Although the above description relates to the handling of mold weights, it will be understood that such apparatus could also be employed for similarly picking off, transferring and setting the molds M between conveyors 1 and 2.

Referring now to FIGS. 5 and 6, there is illustrated therein somewhat modified apparatus for handling mold articles, in this instance the molds M themselves. There is thus illustrated a mold pickoff station A' for lifting the molds M from the conveyor 1 and shifting the molds to the transfer station B'. The transfer station B' is of identical construction with that described above and the mold setting station C' is identical to the pickoff station A' whereby description of only one of such stations will be necessary. The mold pickoff station illustrated in FIGS. 5 and 6 is in certain aspects similar in structure to the pickoff station A previously described above in reference to the handling of the mold weights W, and in such areas of similarity, a brief description only will be provided.

The pickoff station A' comprises a rigidly secured series of vertical frame members 200 and transversely extending frame members 202 which together form the main frame structure. A top supporting frame 204 is provided at the top of such frame and rigidly supports the upper end of a hydraulic cylinder 206. A pair of guide cylinders 208 and 210 are rigidly mounted on the main frame and are adapted to telescopically receive guide rods 212 and 214, respectively. The guide rods are fixed at their lower ends to a carrying arm support carriage generally indicated at 216 to which is mounted oppositely disposed pairs of carrying arms 218 and 220 which function similar to the carrying arms 50 and 52 described above. The cylinder 206 is provided with a piston having a piston rod 224, the bottom of which is secured to the uppermost portion of the carriage assembly 216 whereby reciprocation of the piston rod will effect reciprocation of the carriage. The lower portion of cylinder 206 and the lower portions of the guide cylinders 208 and 210 are additionally supported by beam members 226 and 228 which extend between oppositely disposed posts 200 and are rigidly secured thereto.

The manner in which the carrying arms 218 and 220 are pivoted inwardly or outwardly for supporting or releasing the mold M is similar to that previously described above in reference to the pickoff station A. Thus, each of the carrying arms is rigidly secured at its upper end to support shafts collectively designated at 230, such shafts also rigidly supporting the lower end of link members collectively designated at 232. The upper ends of the link members 232 are connected to transfer rods 234 the inner ends of which are pivotally connected to an oscillating link member 236. The oscillating link 236 is rigidly mounted on transverse shaft 238, as is the upper end of a second oscillating link member 240. The latter is pivotally connected at its lower end to the rod end 242 of a piston-cylinder 244 which is mounted on the carriage 216. It will thus be seen that in the same manner as previously described, actuation of the piston-cylinder 244 will effect oscillation of the link 236 which in turn will cause the link members 232 to simultaneously pivot about the axes through the shafts 230, whereby carrying arms 218 and 220 will thus be carried by the shafts 230 either inwardly or outwardly depending upon the direction of rotation of the shafts.

A pair of L-shaped carrying bars 246 and 248 are connected to the bottoms of the associated carrying arms, and each of said bars carries a set of flanged rollers 250 which are rotatably mounted thereon. When the oppositely disposed carrying arms 218 and 220 are moved to their inner, mold-supporting position subsequent to actuation of the piston-cylinder 244, the rollers 250 are disposed inwardly of the bottom flange of the mold M whereby subsequent upward vertical movement of the carriage assembly 216 by the cylinder 206 lifts the mold M upwardly.

Oppositely disposed pairs of supporting arms 252 are pivotally mounted at their upper ends on support brackets 254 in a manner similar to the supporting arms 88 described above. The supporting arms 252 are similarly provided adjacent the bottom thereof with a carrying bar which extends therebetween and carries a plurality of flanged rollers 256. The rollers 256 when the carrying arms 252 are moved inwardly function to engage the mold M beneath the center flanges of the mold for supporting the same prior to the pushing of the mold M out of the pickoff station A' onto the transfer station B'.

Similar means are provided for pivoting the carrying arms 252 inwardly or outwardly, such means comprising piston-cylinders 258 mounted on suitable support brackets 260, and link members 262, 264, and 266, the latter being connected to the carrying arms. The links 262 and 264 are rigidly mounted on shafts 268 whereby, in the manner previously described, extension of the piston rods of the piston-cylinders 258 will effect outward movement of the link members 264 about the axes of the shafts 268 whereby the carrying arms 252 simultaneously will be moved outwardly.

A discharge ram 270, FIG. 6, is mounted on the main frame and has a mold-engaging plate 272 which is adapted to physically contact the center flange of the mold M and when extended to forcibly push or eject the mold M to the right as viewed in FIG. 6.

Each of the carrying arms 252 is provided adjacent the upper end thereof with a notch or shoulder 272 which is adapted to support end members 274 mounted on the carriage 216 when the latter is lowered by the cylinder 206 during the final stage of the pickoff operation, as will be presently described.

Referring now to the pickoff operation at the pickoff station A', the carriage 216 is initially in its bottommost position, as shown in dotted lines in FIG. 5. As the mold approaches the pickoff station, actuation of the piston-cylinder 244 will move the flanged rollers 250 to a position under the bottom flange of the mold M, the latter being thereby supported by such rollers. The carriage 216 is then raised through actuation of the cylinder 206 to the solid-line position of FIG. 5 with the mold M being lifted by the rollers 250. When the mold M is at such lifted position, the piston-cylinders 258 are actuated to move the supporting arms 252 inwardly to a position wherein the rollers 256 are disposed below the center flange of the mold M. The carriage 216 and the arms 218 and 220 carried thereby are then lowered whereby the mold M is supported solely upon the rollers 256. The downward movement of the carriage 216 is limited by the engagement of the end members 274 thereof with the shoulders 272 of the carrying arms 252 as above described whereby the carriage 216 is in effect suspended on the carrying arms 252. In this suspended position, the rollers 250 will be slightly below the bottom of the mold.

When the mold M is supported by the rollers 256, the discharge ram 270 is actuated whereby the contact plate 272 engages the center flange of the mold and shifts the mold from the pickoff station A' onto the power rolls 280 of the transfer station B'.

Several advantages over existing mold-handling systems should be apparent from the above description. Initially, high speed pickoff is obtainable since the mold M can be lifted before the mold has actually been centered in the pickoff station. Secondly, a faster cycle is obtained since the supporting arms 218 and 220 adjacent the transfer station are spaced so as to accommodate movement of the molds M through the opening defined therebetween whereby such arms need not be raised or otherwise moved in order to clear the mold from the pickoff station. Further, the suspension of the carriage 216 on the carrying arms 252 when the mold is pushed from the pickoff station prevents any chance for malfunctioning and eliminates the otherwise necessary extra controls for midposition holding of the carriage 216 and the arms carried thereby.

It will be understood that a setting station of identical construction will be provided at the opposite end of the transfer station B' whereby the mold M transferred thereto can be accurately set on conveyor means traveling therebelow. Thus the molds M can be transferred between conveyors disposed parallel to each other. It will further be understood that the operation at such setting station will be substantially the reverse of that described at the pickoff station A'.

It will thus be seen that by means of the transfer system of the present invention, articles can be automatically transferred between conveyors at different levels traveling in the same or opposite direction, or can be transferred from and to conveyors moving at right angles to each other.

Other modes of applying the principle of the invention may be employed, change being made as regards the details described, provided the features stated in any of the following claims or the equivalent of such be employed.

I therefore particularly point out and distinctly claim as my invention:

1. Apparatus for handling mold articles for traveling on a conveyor, comprising a pickoff station, means for lifting an article from such conveyor to a predetermined elevation, supporting means for independently supporting said article at such predetermined elevation, means for lowering said lifting means from such elevation for transferring said article to said supporting means, and means for laterally shifting said article from said pickoff station while said article is supported by said supporting means and said lifting means is in such lowered position.

2. The combination of claim 1 wherein said lifting means includes oppositely disposed pairs of spaced arms, with each of such pairs mounting adjacent its lower end means adapted to be disposed beneath respective areas of said article for lifting the same, with each of such pairs of spaced arms when said lifting means is in such lowered position defining an opening through which said article can be moved by said shifting means.

3. The combination of claim 2 wherein said lifting means further includes a carriage, said spaced arms being pivotally mounted on said carriage, said lifting and said lowering means comprises first and second piston-cylinder means mounted in tandem and operatively connected to said carriage for moving the same, said second piston-cylinder means being independently actuatable relative to said first piston-cylinder means for lowering said carriage and said arms carried thereby and transferring support of said article to said supporting means.

4. Mold article setting apparatus for setting a mold article on a conveyor, comprising first supporting means pivotally mounted on said apparatus for receiving and supporting said mold article, second mold article supporting means disposed below said first supporting means when said article is received by the latter and defining an opening through which said article can pass for support by said first supporting means, means for lifting said second supporting means for transferring support of said mold article thereto from said first supporting means and subsequently lowering said article onto a conveyor traveling through said setting station.

5. The combination of claim 4 wherein said first supporting means comprises oppositely disposed, vertically fixed arms which mount means for supporting said article, said second supporting means comprises oppositely disposed pairs of spaced arms which mount means for supporting a mold article, each pair of said spaced arms comprising said second supporting means being pivotally mounted for movement in a direction normal to the direction of pivotal movement of said vertically fixed arms, at least one pair of said spaced arms defining an opening through which a mold article can pass.

6. The combination of claim 4 wherein said lifting and lowering means comprises a first piston-cylinder means, vertically movable carriage means, said second supporting means being carried by and pivotally mounted on said carriage means, first and second piston-cylinder means mounted in tandem and operatively connected to said carriage means for moving the same, said second piston-cylinder means being independently actuatable relative to said first piston-cylinder means for first raising said carriage and said second supporting means for transferring support of the mold article to the latter, and for lowering said mold article onto such conveyor when said first piston-cylinder means has lowered said carriage to a position wherein said mold article is slightly above such conveyor.

7. Apparatus for picking off and laterally transferring mold articles traveling on a conveyor, comprising carriage means, power means for vertically moving said carriage means, first supporting arm means pivotally mounted on said carriage and adapted when said carriage is lowered by said power means to receive and support a mold article and to lift the same to a predetermined level when said carriage is raised by said power means, second supporting arm means pivotally mounted on said apparatus for independently supporting such mold article at such predetermined elevation when said first supporting arm means is lowered by said power means a relatively slight distance for transferring support of said article to said second supporting arm means, and means for laterally shifting said article while supported by said second supporting arm means and while said first supporting arm means is in such slightly lowered position, said first supporting arm means when in such latter position defining an opening through which said mold article can pass.

8. The combination of claim 7 wherein said power means includes a first piston-cylinder means and a second piston-cylinder means carried by the movable piston of said first piston-cylinder means and actuatable independently of the latter.

9. A system for handling mold articles, comprising a pickoff station, means for lifting an article from a conveyor traveling through said pickoff station to a predetermined elevation, supporting means for independently supporting said article at such predetermined elevation, means for lowering said lifting means from such elevation for transferring said article to said supporting means, means for laterally shifting said article from said pickoff station while said article is supported by said supporting means and said lifting means is in such lower position, means for receiving such laterally shifted article and transferring the same to a mold setting station, said mold setting station comprising first supporting means for receiving and supporting a mold article delivered to said setting station, supporting means disposed below said first supporting means when said article is received by the latter and defining an opening through which said article can pass for support by said first supporting means, means for lifting said second supporting means for transferring support of said mold article thereto from said first supporting means and subsequently lowering said article onto a conveyor traveling through said setting station.

10. The combination of claim 9 wherein said means for lifting and lowering said mold article at each of said pickoff and setting stations includes a first piston-cylinder means and a second piston-cylinder means carried by the movable piston of said first piston-cylinder means and actuatable independently of the latter.

11. Apparatus for transferring mold articles between vertically spaced elevations, comprising vertically movable carriage means, first supporting arm means pivotally mounted on said carriage means and movable vertically therewith, power means for vertically moving said carriage, said power means including first piston-cylinder means for vertically moving said carriage relatively extended distances, second piston-cylinder means carried by the movable piston of said first piston-cylinder means and independently actuatable relative thereto for vertically moving said carriage relatively shorter distances, second supporting arm means vertically fixed and pivotally mounted on said apparatus and movable in a direction normal to the direction of pivotal movement of said first supporting arm means, said first supporting arm means being disposed slightly below said second supporting arm means when a mold article is transferred laterally to or from said second supporting arm means, said first supporting arm means being constructed and arranged to provide while in such latter position an opening through which a mold article can pass.

References Cited by the Examiner

UNITED STATES PATENTS

| 2,934,221 | 4/1960 | Tonna | 198—24 |
| 3,068,987 | 12/1962 | Franklin | 198—24 |

FOREIGN PATENTS

| 714,361 | 8/1954 | Great Britain. |
| 787,402 | 12/1957 | Great Britain. |
| 118,602 | 6/1958 | Russia. |

SAMUEL F. COLEMAN, *Primary Examiner.*

RICHARD E. AEGERTER, *Examiner.*